(12) United States Patent
Klee et al.

(10) Patent No.: US 9,188,469 B2
(45) Date of Patent: Nov. 17, 2015

(54) SENSOR SYSTEM FOR MEASURING A VELOCITY OF A FLUID INCLUDING A HEATING ELEMENT A RESONANT CIRCUIT AND A TRANSDUCER

(75) Inventors: Mareike Klee, Eindhoven (NL); Jaap Roger Haartsen, Eindhoven (NL)

(73) Assignee: KONINKLIJKE PHILIPS N.V., Einhoven (NL)

( * ) Notice: Subject to any disclaimer, the term of this patent is extended or adjusted under 35 U.S.C. 154(b) by 571 days.

(21) Appl. No.: 13/502,386

(22) PCT Filed: Oct. 15, 2010

(86) PCT No.: PCT/IB2010/054677
§ 371 (c)(1),
(2), (4) Date: Apr. 17, 2012

(87) PCT Pub. No.: WO2011/048534
PCT Pub. Date: Apr. 28, 2011

(65) Prior Publication Data
US 2012/0210781 A1    Aug. 23, 2012

(30) Foreign Application Priority Data
Oct. 21, 2009   (EP) ..................................... 09173627

(51) Int. Cl.
G01F 1/68     (2006.01)
G01F 1/688    (2006.01)
G01F 1/696    (2006.01)
G01F 1/698    (2006.01)
G01F 1/699    (2006.01)

(52) U.S. Cl.
CPC .............. *G01F 1/688* (2013.01); *G01F 1/6882* (2013.01); *G01F 1/696* (2013.01); *G01F 1/699* (2013.01); *G01F 1/6986* (2013.01)

(58) Field of Classification Search
None
See application file for complete search history.

(56) References Cited

U.S. PATENT DOCUMENTS 4,726,225 A    2/1988   Brace
4,934,188 A    6/1990   Tanimoto
(Continued)

FOREIGN PATENT DOCUMENTS

JP    63088465 A    4/1988
JP    63317724 A    12/1988
(Continued)

OTHER PUBLICATIONS

Benes, E. et al "Comparison between BAW and SAW Sensor Principles" 1997 IEEE International Frequency Control Symposium, pp. 5-20.

(Continued)

*Primary Examiner* — Harshad R Patel (57) ABSTRACT

A sensor system for measuring a velocity of a fluid flowing through a channel includes a heating element for heating the fluid. The heating element is provided with a predetermined level of power during operation. The sensor system further includes a primary electronic circuit having a primary resonance frequency which is temperature dependent. The temperature of the primary electronic circuit is determined by heat transferred from the heating element to the fluid flowing through the channel. In addition, the sensor system also includes a transducer arrangement configured to generate a measurement signal indicative of the velocity of the fluid flowing through the channel. The measurement signal is based on the primary resonance frequency.

6 Claims, 3 Drawing Sheets

(56) References Cited

U.S. PATENT DOCUMENTS

| | | | |
|---|---|---|---|
| 5,663,506 A | | 9/1997 | Moore |
| 7,119,308 B2* | | 10/2006 | Kopel .......................... 219/494 |
| 8,040,493 B2* | | 10/2011 | Fulkerson et al. .............. 356/28 |
| 2002/0013527 A1 | | 1/2002 | Hoek |
| 2002/0194908 A1* | | 12/2002 | Sparks ...................... 73/204.26 |
| 2003/0056585 A1* | | 3/2003 | Furuki et al. ............... 73/204.19 |
| 2004/0039298 A1* | | 2/2004 | Abreu .......................... 600/558 |
| 2005/0080346 A1* | | 4/2005 | Gianchandani et al. ...... 600/486 |
| 2005/0277839 A1 | | 12/2005 | Alderman |
| 2006/0144155 A1 | | 7/2006 | Liu |
| 2006/0191354 A1 | | 8/2006 | Schulz |
| 2007/0051176 A1 | | 3/2007 | Liu |
| 2010/0218608 A1* | | 9/2010 | Eckert et al. ................... 73/584 |

FOREIGN PATENT DOCUMENTS

| JP | 1994117900 A | 4/1994 |
|---|---|---|
| JP | 2009122092 A | 6/2009 |

OTHER PUBLICATIONS

Ong, K.G. et al "Design and Application of a Wireless, Passive, Resonant-Circuit Environmental Monitoring Sensor", Sensors and Actuators A, vol. 93, 2001, pp. 33-43.

DeHennis, Andrew D. et al "A Fully Integrated Multisite Pressure Sensor for Wireless Arterial Flow Characterization", Journal of Microelectromechanical Systems, vol. 15, No. 3, Jun. 2006, pp. 678-685.

Takahata, Kenichi et al "A Wireless Microsensor for Monitoring Flow and Pressure in a Blood Vessel Utilizing a Dual-Inductor Antenna Stent and Two Pressure Sensors" 17th IEEE International Conference on (MEMS) Micro Electro Mechanical Systems, 2004, pp. 216-219.

Birdsell, Edward et al "Wireless Chemical Sensors for High Temperature Environments" Solid-State Sensors, Actuators, and Microsystems Workshop, Hilton Head Island, South Carolina, Jun. 4-8, 2006.

* cited by examiner

SENSOR SYSTEM FOR MEASURING A VELOCITY OF A FLUID INCLUDING A HEATING ELEMENT A RESONANT CIRCUIT AND A TRANSDUCER

FIELD OF THE INVENTION

The invention relates to a sensor system for measuring a velocity of a fluid flowing through a channel.

BACKGROUND OF THE INVENTION

US 2006/0144155 A1 discloses a flow sensor system comprising upstream and downstream pressure sensing devices for detecting a differential pressure in a flow. Each pressure sensing device comprises a diaphragm, a capacitor and an inductor to form an LC tank circuit. The capacitor can be mechanically coupled to the diaphragm such that a deflection of the diaphragm in response to fluid pressure applied thereto causes a change in the resonance frequency of the LC tank circuit.

A problem of the sensor system disclosed in US 2006/0144155 A1 is that it is not capable of measuring flow rate in the instance of non-steady fluid flow conditions, i.e. fluid flow that is explicitly depending on time. Namely, in US 2006/0144155 A1 flow rate is determined by substituting the differential pressure as measured in the well known Bernoulli equation for incompressible liquid flow. The latter equation does hold for spatially varying fluid flow, however, it fails to hold true for time varying i.e. non-steady fluid flow.

SUMMARY OF THE INVENTION

It is an object of the invention to provide a sensor system according to the opening paragraph, capable of accurately measuring the velocity of a fluid, i.e. a gas or a liquid, flowing through a channel in both steady and non-steady fluid flow conditions.

The object of the invention is achieved by the sensor system according to the invention. The sensor system according to the invention comprises a heating element for heating the fluid, wherein the heating element is provided with a predetermined level of power during operation. The sensor system according to the invention furthermore comprises a primary electronic circuit having a primary resonance frequency, which primary resonance frequency is temperature dependent, wherein a temperature of at least a part of the primary electronic circuit is determined by heat transferred from the heating element to the fluid flowing through the channel, which part is responsible for making the primary resonance frequency resonance temperature dependent. The sensor system according to the invention furthermore comprises a transducer arrangement configured for generating a measurement signal indicative for the velocity of the fluid flowing through the channel, wherein the measurement signal is based on the primary resonance frequency.

Presuming a known level e.g. a predetermined or constant level of power provided to the heating element during operation, an increase of the velocity of the fluid flowing through the channel results in an increase of the amount of heat transferred by the heating element to the fluid. Consequently, an increase in fluid flow velocity results in a decrease of the temperature of the heating element and accordingly results in an increase of the temperature of the fluid to which heat has been transferred. By situating a primary electronic circuit in the sensor system such that its temperature is affected by the amount of heat transferred from the heating element, the primary electronic circuit's temperature provides an indirect measure for fluid flow velocity. The aforementioned relationship between fluid flow velocity and temperature equally holds for both steady and non-steady fluid flow. Thus by making the primary electronic circuit's primary resonance frequency temperature dependent, the primary resonance frequency provides a measure for fluid flow velocity that is robust regarding time dependent behavior of the velocity of the fluid flowing through the channel. Through basing the measurement signal indicative of the fluid's velocity on the temperature dependent resonance frequency, the sensor system according to the invention is capable of accurately measuring the velocity of the fluid for steady as well as non-steady fluid flow conditions.

As a result, the sensor system according to the invention particularly allows for successful application in respiration systems such as nebulizers and medical implantables in fluid communication with a vein that is situated in close proximity of the heart, which applications are characterized by non-steady fluid flow.

That is, in respiration systems the fluid flow repetitively changes direction in accordance with the respiratory pattern of the patient at hand, and consequently the fluid flow has a non-steady nature. Furthermore, medical implantables in fluid communication with a vein situated in close proximity of the heart experience the pulsating fluid flow resulting from the cardiac cycle, which fluid flow is inherently non-steady. Furthermore in gravity driven systems for intravenous therapy, fluid flow typically changes from non-steady behavior near the drip chamber to steady behavior in the reservoir in front of the needle where accumulation of the droplets released from the drip chamber takes place. Therefore, the sensor system according to the invention advantageously allows for proper application at any location along the channel extending from the drip chamber to the needle without taking precautionary measures for that purpose.

In this text, a fluid is interpreted to cover a liquid, a gas as well as a mixture of a liquid and a gas, e.g. an aerosol.

In a preferred embodiment of the sensor system according to the invention, the transducer arrangement comprises a grid dip oscillator for determining the resonance frequency of the primary circuit. A grid dip oscillator comprises a tuning circuit that generates an RF signal which is absorbed by the primary circuit via inductive coupling. The grid dip oscillator registers the amount of absorption by the primary circuit. Said amount of absorption will be maximal if the frequency of the RF signal coincides with the primary circuit's primary resonance frequency. This embodiment is advantageous in that it is capable of wirelessly determining the primary resonance frequency, and hence the velocity of the flow flowing through the channel, without a high order of complexity. That is, the use of a grid dip oscillator prevents the complexity generally associated with wireless sensor systems. Namely, there is no need for transforming the physical signal of interest to the electrical domain, to amplify the electrical signal, to sample and convert the electrical signal to the digital domain, to transmit the digital signal as data packages on an RF carrier signal, to decode the RF carrier signal after receiving, to compare the decoded RF signal with a calibration curve and to eventually transform it back to the physical quantity of interest.

It is to be noted that the publication of K. G. Ong, C. A. Grimes, C. L. Robbins and R. S. Singh, *Design and application of a wireless, passive, resonance-circuit environmental monitoring system, Systems and Actuators A* 93 (2001) 33-43, discloses a system for measuring temperature by way of an electronic circuit having a temperature dependent resonance frequency. However, the latter system is not capable of measuring fluid flow velocity since it is a system for measuring temperature as such, i.e. the latter system performs as a thermometer. Furthermore, the system discussed in the aforementioned publication is intended to be passive, i.e. to operate without supplying power to it. The sensor system according to the invention is supplied with power for the purpose of heating the fluid during operation. The latter power supply causes the sensor system according to the invention to be active in contrast with the sensor according to the aforementioned publication. In addition to that, the sensor disclosed in the aforementioned publication is interrogated with one or two antennas which lack the above listed advantages of the grid dip oscillator.

In a further preferred embodiment of the sensor system according to invention, the heating element comprises a resistor for receiving power wherein the heating element comprises a resistor for receiving power via an inductive coupling with the grid dip oscillator. This embodiment advantageously physically separates the heating element and the primary circuit from the transducer arrangement, i.e. the heating element and the primary circuit allow for wireless operation with regard to the transducer arrangement. Thereby, this embodiment advantageously enables measuring fluid flow velocity at remote locations that prohibit the use of bothersome wiring. For example, the measurement of fluid flow in or around implants in the human body will benefit from such absence of wiring. Furthermore, this embodiment is advantageous in that it allows for an economically attractive employment in applications in which the channel is to be regularly replaced, for instance sterile medical applications such as intravenous infusion, anesthesia flow control, urinary catheters, breathing control and enteral and parenteral nutrition flow measurement. In such a business model, the transducer arrangement comprising the grid dip oscillator, which is the most expensive part of the sensor system, is reusable while the heating element and the primary circuit are disposed of together with the channel. For that purpose, the heating element and the primary circuit are incorporated within a wall of the channel. Obviously, the primary circuit and the heating element need not necessarily be dispose of, i.e. they do allow for a prolonged use. This embodiment is particularly suited for the aforementioned business model since no efforts are required for disconnecting the reusable transducer arrangement from the disposable components of the sensor system.

In a further preferred embodiment of the sensor system according to the invention, the primary electronic circuit comprises an inductor and a capacitor in series connection wherein the capacitor has a capacitance that is dependent on temperature. This embodiment effectively realizes an LC circuit, i.e. a circuit comprising a capacitor having a capacitance C and an inductor having an inductance L, which LC circuit features a temperature dependent resonance frequency. That is, the resonance frequency $\omega_0$ of an LC circuit is given by the following equation:

$$\omega_0 = \frac{1}{\sqrt{LC}}. \qquad [1]$$

By making the capacitance C dependent on temperature T, i.e. C=C(T), a temperature dependent resonance frequency is obtained for the primary circuit according to:

$$\omega_0 = \omega_0(T) = \frac{1}{\sqrt{LC(T)}}. \qquad [2]$$

In a practical embodiment of the sensor system according to the invention, the primary electronic circuit is in thermal communication with the heating element for the purpose of effecting that the temperature of the part being responsible for the temperature dependent behavior of the primary resonance frequency is determined by heat transferred from the heating element to the fluid. In this text, thermal communication between objects means that said objects are connected via heat transfer. The latter heat transfer causes the temperatures of the objects to mutually correlate. In practice, this means that fluctuations of temperature are similarly followed by the other temperature. A significant thermal resistance, i.e. a thermal isolation, installed between objects prevents them from being in thermal communication. Hence, thermal communication between objects requires the absence of a major thermal resistance there between.

In a further preferred embodiment of the sensor system according to the invention, the heating element comprises the capacitor. Due to incorporating the capacitor in the heating element, the heating element and at least the temperature sensitive part of the primary circuit are in close proximity. Therefore, this embodiment advantageously materializes excellent thermal communication between the heating element and the capacitor.

In a further preferred embodiment of the sensor system according to the invention, the sensor system comprises a reference electronic circuit having a temperature dependent reference resonance frequency, wherein the transducer arrangement is arranged for generating the measurement signal based on a numerical difference between the primary and reference resonance frequencies. This embodiment is advantageous in that it is more robust regarding the disturbing influence due to fluctuations in ambient temperature. Namely, by basing the measurement signal on the numerical difference between the primary and the reference resonance frequencies, a differential measurement is obtained that compensates for said ambient temperature fluctuations. Preferably, the reference electronic circuit is thermally isolated from the heating element.

In a further preferred embodiment of the sensor system according to the invention, the primary electronic circuit and the reference electronic circuit are substantially equal. Herein the primary electronic circuit comprises a primary inductor and a primary capacitor in series connection. Consequently the reference electronic circuit comprises a reference inductor and a reference capacitor having a reference capacitance that equals the primary capacitance if the primary and reference capacitors are subject to equal temperatures. The reference electronic circuit furthermore comprises a reference inductor that is installed in series with the reference capacitor and having a reference inductance equal to the primary inductance. As a result, the temperature dependent behavior of the resonance frequency associated with the reference electronic circuit, i.e. the reference resonance frequency, mirrors the temperature dependent behavior of the primary resonance frequency. This embodiment advantageously cancels the dependency on the Curie temperature of the ferro-electric material which is used as dielectric in the capacitors. Namely, the relative permittivity $\in_r$ associated with the ferro-electric material displays a temperature dependency following the Curie-Weiss law:

$$\varepsilon_r = \varepsilon_r(T) = \frac{c}{T - T_c}, \qquad [3]$$

wherein c denotes the Curie constant and $T_c$ is the Curie temperature. For temperatures T below said Curie temperature $T_c$, at which temperature a phase transition takes place, the relative permittivity of the dielectric decreases with decreasing temperature. Thereby temperature dependency is obtained for the primary capacitance $C_p$ of the capacitor incorporating the ferro-electric as dielectric according to the following relation:

$$C_p(T) = \frac{\varepsilon_r(T)\varepsilon_0 A_p}{d_p}, \qquad [4]$$

wherein $\varepsilon_0$ denotes the permittivity of vacuum, $A_p$, is the primary capacitor area and $d_p$, is the distance between the primary capacitor's plates. As a result, the temperature dependent primary resonance frequency $\omega_p$ is given by the following equation:

$$\omega_p = \omega_p(T_p) = \frac{1}{\sqrt{L_p C_p(T_p)}} = \sqrt{\frac{d_p(T_p - T_c)}{C\varepsilon_0 A_p L_p}}, \qquad [5]$$

wherein $T_p$, denotes the temperature at the primary electronic circuit. Preferably, this temperature equals the temperature of the heating element itself. Likewise, the temperature dependent reference resonance frequency $\omega_{ref}$ follows from:

$$\omega_{ref} = \omega_{ref}(T_{ref}) = \frac{1}{\sqrt{L_{ref} C_{ref}(T_{ref})}} = \sqrt{\frac{d_{ref}(T_{ref} - T_c)}{C\varepsilon_0 A_{ref} L_{ref}}}. \qquad [6]$$

Now, by basing the measurement signal on a numerical difference between the primary and reference resonance frequencies, e.g. by relating the measurement signal to the differential $\omega_p^2 - \omega_{ref}^2$, the measurement signal is advantageously independent from the Curie temperature of the ferro-electric at hand. Namely, since the primary and reference electronic circuits are substantially identical, it holds that:

$$\omega_p^2 - \omega_{ref}^2 = \frac{d_p(T_p - T_c)}{C\varepsilon_0 A_p L_p} - \frac{d_{ref}(T_{ref} - T_c)}{C\varepsilon_0 A_{ref} L_{ref}} = \frac{d(T_p - T_{ref})}{C\varepsilon_0 AL}, \qquad [7]$$

wherein $d = d_p = d_{ref}$, $A = A_p = A_{ref}$ and $L = L_p = L_{ref}$ if manufacturing tolerances are neglected.

In a further preferred embodiment of the sensor system according to the invention, the sensor system comprises a secondary electronic circuit in thermal communication with the heating element having a temperature dependent secondary resonance frequency, wherein the primary and secondary electronic circuits are situated at predetermined locations on opposite sides of the heating element along an axis having a component parallel to a longitudinal axis of the channel, wherein the transducer arrangement is arranged for generating the measurement signal based on a difference between the primary and secondary resonance frequencies, and wherein the primary and secondary electronic circuits are in thermal communication with the fluid flowing through the channel. This embodiment is advantageous in that it is robust against changes in ambient temperature. Namely, the disturbing influence of ambient temperature fluctuations is effectively cancelled since the measurement signal is based on a differential of the primary and secondary resonance frequencies, which frequencies are equally affected by fluctuations in ambient temperature. Furthermore, this embodiment is advantageous in that it is capable of registering changes in the direction at which the fluid is flowing through the channel. Namely, if the fluid flow changes direction the measurement signal accordingly changes sign.

In a further preferred embodiment of the sensor system according to the invention, the sensor system comprises a secondary electronic circuit in thermal communication with the heating element having a temperature dependent secondary resonance frequency, wherein the primary and secondary electronic circuits are situated at predetermined locations on opposite sides of the heating element along an axis having a component parallel to a longitudinal axis of the channel, wherein the transducer arrangement is arranged for generating the measurement signal based on a difference between the primary and secondary resonance frequencies, and wherein the primary and secondary electronic circuits are in thermal communication with the heating element. This embodiment has the advantage of being robust against changes in ambient temperature. Namely, by basing the measurement signal on a differential of the primary and secondary resonance frequencies the disturbing influence of ambient temperature fluctuations is cancelled since said frequencies are equally affected by ambient temperature fluctuations. Furthermore, this embodiment is advantageous in that it is capable of registering changes in the direction at which the fluid is flowing through the channel. Namely, if the fluid flow changes direction the measurement signal accordingly changes sign.

In a further preferred embodiment of the sensor system according to the invention, the primary electronic circuit comprises a primary inductor and a primary capacitor having a primary capacitance that is dependent on temperature, wherein the reference electronic circuit is substantially identical to the primary electronic circuit. In addition to registering fluid flow direction, this embodiment advantageously cancels the measurement signal's dependency on the Curie temperature of the ferro-electric employed as dielectric in the primary and secondary capacitors. Namely, by relating the measurement signal on a numerical difference between the primary resonance frequency $\omega_p$ and the secondary resonance frequencies $\omega_s$, e.g. by relating the measurement signal to the differential $\omega_p^2 - \omega_s^2$, the measurement signal does not depend on the Curie temperature of the ferro-electric at hand. Namely, since the primary and reference electronic circuits are substantially identical, by analogously applying equation [7] to the configuration of the primary and secondary electronic circuits at hand, it is obtained that:

$$\omega_p^2 - \omega_s^2 = \frac{d_p(T_p - T_c)}{C\varepsilon_0 A_p L_p} - \frac{d_s(T_s - T_c)}{C\varepsilon_0 A_s L_s} = \frac{d(T_p - T_s)}{C\varepsilon_0 AL}, \qquad [8]$$

wherein $T_p$ and $T_s$, are the temperatures at the primary and secondary circuits, respectively, and $d = d_p = d_s$, $A = A_p = A_s$ and $L = L_p = L_s$ if manufacturing tolerances that are present in practice are neglected.

The preferably tunable capacitors and inductors comprised in the electronic circuits, may be realized using conventional discrete elements. The other components present in the sensor system such as the heating element may be manufactured from discrete elements as well. For application such as invenous blood flow detection, small sensor systems are strongly preferred. For this purpose integrated electronic circuits e.g. comprising ferro-electric capacitors comprising a stacking of electrically conducting layers interspersed with electrically isolating layers, and inductors integrated on silicon substrates, may be very beneficial.

In a further preferred embodiment of the sensor system according to the invention, the sensor system comprises a secondary electronic circuit in thermal communication with the heating element and having a secondary resonance frequency, a reference electronic circuit having a reference resonance frequency, and a further electronic circuit in thermal communication with the heating element and having a further resonance frequency. Herein the primary circuit comprises a primary inductor and a primary capacitor having a primary capacitance which is dependent on temperature. Furthermore the primary, secondary, further and reference electronic circuits are substantially identical. The secondary and further electronic circuits are situated at predetermined locations on opposite sides of the heating element along an axis having a component parallel to a longitudinal axis of the channel. In this embodiment, the transducer arrangement is configured for generating the measurement signal based on a ratio of the numerical difference between the secondary and further resonance frequencies, i.e. $\omega_s$ and $\omega_f$, and ok, and the numerical difference between the primary and reference resonance frequencies, i.e. $\omega_p$ and $\omega_{ref}$. By relating the measurement signal to such a ratio, e.g.

$$\frac{\omega_p^2 - \omega_{ref}^2}{\omega_s^2 - \omega_f^2},$$

this embodiment is advantageously capable of generates a measurement signal that is independent from the various parameters of the electronic circuits. That is, the measurement signal neither depends on the width between the capacitor plates d, the capacitor's area A, the inductance L nor the Curie temperature $T_c$. Since the measurement signal is independent from processing variations between the individual electronic circuits, the need to calibrate every signal electronic circuit is effectively eliminated. Furthermore, the measurement signal is independent from the actual amount of power supplied to or dissipated by the heating element, which quality allows the physical distance between a power source and the heating element to be non-constant without affecting the measurement signal. In addition to that, fluctuations in the capacitor's capacitance due to variations in the electrical field strength caused by possible variations in the distance between the power source and the capacitor, is effectively canceled. Namely, since the electronic circuits comprised in this embodiment are identical, by analogously employing equation [7] it is obtained that:

$$\frac{\omega_p^2 - \omega_{ref}^2}{\omega_s^2 - \omega_f^2} = \frac{T_p - T_{ref}}{T_s - T_f}, \quad [9]$$

wherein $T_p$, denotes the temperature at the primary electronic circuit, $T_{ref}$ is the temperature at the reference electronic circuit, $T_s$ denotes the temperature at the secondary electronic circuit and $T_f$ indicates the temperature at the further electronic circuit. The inverse of the ratio given by equation [9], i.e.

$$\frac{\omega_s^2 - \omega_f^2}{\omega_p^2 - \omega_{ref}^2},$$

may be equally successfully employed.

In a further preferred embodiment of the sensor system according to the invention, the sensor system comprises a power source configured for providing the heating element with a predetermined time varying level of power, wherein the primary electronic circuit is situated at a predetermined distance from the heating element along an axis having a component parallel to a longitudinal axis of the channel, and wherein the transducer arrangement is configured for generating the measurement signal based on the duration after which the primary resonance frequency changes in response to the time varying level of power. In this embodiment, the measurement signal relates to the moment of a frequency shift rather than the value of the frequency shift. Therefore, in this embodiment the disturbing effects due to e.g. processing variations, electric field dependency of the relative permittivity, the amount of dissipated power and parameter variations of the primary electronic circuit are advantageously cancelled.

In a further preferred embodiment of the sensor system according to the invention, the power source is configured for providing the heating element with a power pulse. This embodiment is particularly suitable for applications in which high fluid flow velocities are expected.

In a further preferred embodiment of the sensor system according to the invention, the power source is configured for providing the heating element with a sinusoidally varying level of power. This embodiment is advantageous in that it allows for measuring the phase shift between the sinusoidally varying level of power and the sinusoidally varying primary resonance frequency in response thereto.

SHORT DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers in the aforementioned figures refer to identical or similar components.

DETAILED DESCRIPTION OF THE EMBODIMENTS

Figure 1:
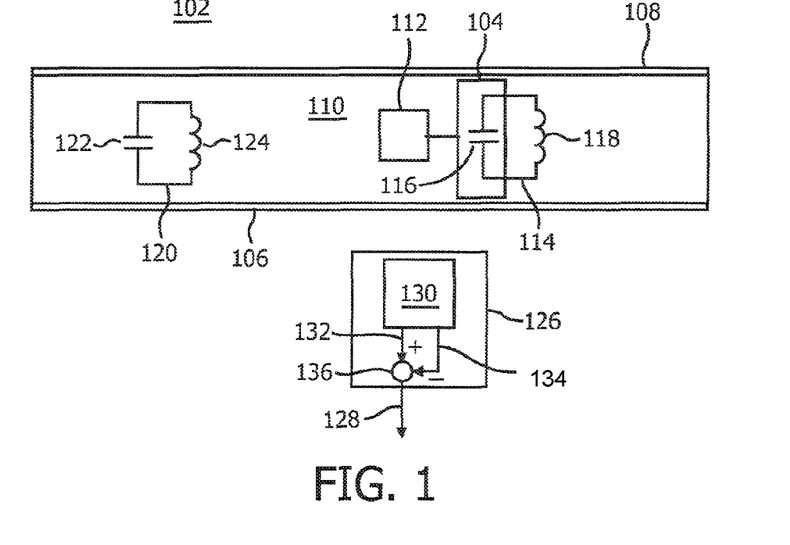
FIG. 1 schematically displays an embodiment of the sensor system according to the invention comprising a reference electronic circuit situated substantially remote from the heating element.

FIG. 1 schematically displays a sensor system 102 for measuring a velocity of a fluid 110, i.e. a gas or a liquid, flowing through a channel 108. The sensor system 102 comprises a heating element 104 for heating the fluid 110, which heating element 104 is provided with a predetermined hence known level of power during operation. The sensor system 102 furthermore comprises a primary electronic circuit 114 having a temperature dependent primary resonance frequency. Herein, the temperature of the part of the primary electronic circuit 114 that is responsible for the temperature dependent behavior of the primary resonance frequency is determined by the heat transferred from the heating element 104 to the fluid 110.

The heating element's temperature depends on the amount of power supplied to the heating element 104 by the power source 112 during operation and on the amount of heat transferred from the heating element 104 to its surroundings including the fluid 110. The amount of heat transferred from the heating element 104 to the fluid 110 is determined by the velocity at which the fluid 110 is flowing through the channel 108. At zero flow conditions, heat transfer from the heating element 104 to the fluid 110 occurs through conduction only. For non-zero flow conditions, heat transfer is mainly determined by forced convection. An increase in fluid flow velocity will augment convection based heat transfer. Therefore fluid flow velocity affects the heating element's temperature in an inversely proportional way. Consequently, the heating element's temperature will attain a maximum value if there is zero fluid flow, irrespective the type of fluid involved, i.e. gas or liquid. Presuming a known supply of power to the heating element 104 during operation, the heating element's temperature is directly correlated to the fluid flow velocity. That is, fluctuations of the heating element's temperature other than those due to possible fluctuations in the amount of power supplied to the heating element 104, are attributable to fluctuations in the velocity at which the fluid 110 is flowing to the channel 108. Thereby, the heating element's temperature provides an indirect measure for fluid flow velocity.

Because the temperature of at least the part of the primary electronic circuit 114 that is responsible for making the primary resonance frequency temperature dependent is determined by heat transferred from the heating element 104 tot the fluid 110, the temperature of said part of the primary electronic circuit 114 is likewise affected by fluid flow velocity. Therefore, the primary resonance frequency of the primary electronic circuit 114 is indicative for the velocity at which the fluid 110 is flowing though the channel 108.

The sensor system 102 comprises a transducer arrangement 126 for generating a measurement signal 128 indicative for the velocity of the fluid 110 based on the primary resonance frequency associated with the primary electronic circuit 114.

In an embodiment of the sensor system 102, the heating element 104 is installed in a wall 106 of a channel 108 through which a fluid 110, is flowing. Preferably little thermal resistance is present between the heating element 104 and the fluid 110. A power source 112 known per se, e.g. a battery, is configured for providing a known level of power to the heating element 104 during operational conditions.

In an embodiment of the sensor system 102, the primary electronic circuit 114 comprises a primary capacitor 116 having a temperature dependent primary capacitance and a primary inductor 118 having a primary inductance. In order to increase the correlation between the part of the primary electronic circuit 114 responsible for making the primary resonance frequency temperature dependent, i.e. the primary capacitor 116, and the heat transferred from the heating element 104 to the fluid 110, the primary capacitor 116 is in thermal communication with the heating element 104. Herein the primary capacitor 116 is comprised in the heating element 104 as to guarantee excellent thermal communication between the primary capacitor 116 and the heating element 104. As a result, the temperature of at least the primary capacitor 116 resembles the temperature of the heating element 104, i.e. the temperature of at least the primary capacitor 116 is substantially equal to the temperature of the heating element 104. For the sake of convenience, the primary electronic circuit 114 is installed in the wall 106 as well. However, it may be equally well installed on an exterior of the channel 108 or remote from the channel 108 provided that at least the primary capacitor 116 is in thermal communication with the heating element 104.

A specific embodiment of the sensor system 102 comprises a reference electronic circuit 120. Herein, the reference electronic circuit 120 is thermally isolated from the heating element 104. Consequently, the reference electronic circuit 120 and the heating element 104 are not in thermal communication. As a result the temperature of the reference electronic circuit 120 resembles the ambient temperature rather than resembling the temperature of the heating element. In this particular example, for the sake of convenience, the reference electronic circuit 120 is installed in the wall 106 of the channel 108 as well. However, it may be equally situated remote from the channel 108 provided that it is subject to an equal ambient temperature compared to the primary electronic circuit 114. In order to thermally isolate the reference electronic circuit 120 from the heating element 104, the reference electronic circuit is situated substantially remote from the heating element 104. In this specific example, the measurement signal 128 is based on the numerical difference between the primary and reference resonance frequencies according to equation [7], In a particular embodiment of the sensor system 102, the transducer arrangement 126 comprises a grid dip oscillator 130 known per se for wirelessly determining the primary and reference resonance frequencies. For example, during operation the primary and reference resonance frequencies are being sampled in an alternating way. A signal 132 represents the primary resonance frequency whereas a further signal 134 represents the reference resonance frequency as determined by the grid dip oscillator 130. The transducer arrangement 126 is physically separated from the remaining part of the sensor system 102. This separation is deliberately indicated as such in FIG. 1. The measurement signal 128, which relates to the numerical difference between the primary and reference resonance frequencies, is generated by way of, e.g., a comparator 136. Thereby, the measurement signal 128 is robust regarding fluctuations in ambient temperature since these fluctuations are compensated for by relating the measurement signal 128 to the reference resonance frequency.

In the particular embodiment of the sensor system 102 under consideration, the primary and reference electronic circuits 114 and 120 are substantially identical. That is, the reference electronic circuit 120 comprises a reference capacitor 122 having a reference capacitance that equals the primary capacitance if the primary and reference capacitors 116 and 122 are subject to equal temperatures, which equal temperatures are in general not the case in this embodiment. The reference electronic circuit 120 furthermore comprises a reference inductor 124 having a reference inductance equal to the primary inductance. As a result, the temperature dependent behavior of the resonance frequency associated with the reference electronic circuit 120, i.e. the reference resonance frequency, mirrors the temperature dependent behavior of the primary resonance frequency.

Figure 2:
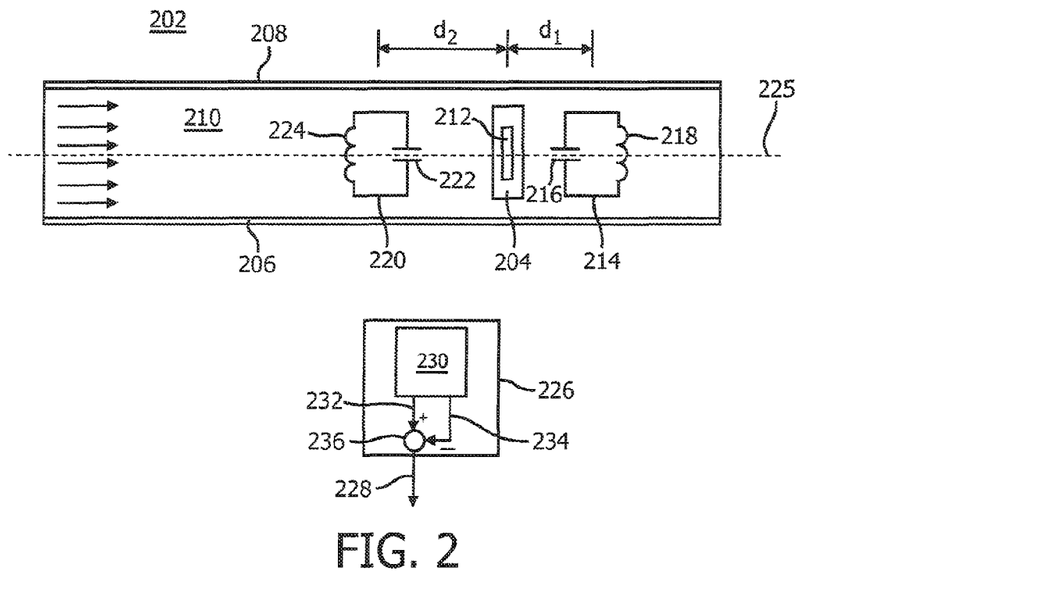
FIG. 2 schematically depicts an embodiment of the sensor system according to the invention wherein primary and secondary electronic circuits are situated on opposite locations of the heating element and wherein the primary and secondary electronic circuits are in thermal communication with the fluid.

FIG. 2 schematically depicts a sensor system 202, comprising a heating element 204 which is installed in a wall 206 of a channel 208 through which a fluid 210 is flowing. The sensor system 202 furthermore comprises a primary electronic circuit 214. In this particular example, the primary electronic circuit 214 comprises a primary capacitor 216 having a temperature dependent primary capacitance and a primary inductor 218 having a primary inductance. Consequently, the primary electronic circuit 214 is characterized by a temperature dependent primary resonance frequency, see equation [2]. In this specific embodiment the sensor system 202 furthermore comprises a secondary electronic circuit 220. In this particular embodiment, the primary and secondary electronic circuits 214 and 220 are substantially identical. Hence the secondary electronic circuit 220 comprises a secondary capacitor 222 having a secondary capacitance that equals the primary capacitance if the primary and secondary capacitors 216 and 222 are subject to equal temperatures. The secondary electronic circuit 220 furthermore comprises a secondary inductor 224 having a secondary inductance equal to the primary inductance. As a result, the temperature dependent behavior of the resonance frequency associated with the secondary electronic circuit 220, i.e. the secondary resonance frequency, equals the temperature dependent behavior of the primary resonance frequency.

The primary electronic circuit 214 and the secondary electronic circuit 220 are situated at predetermined locations on opposite sides of the heating element 204 along an axis 225 having at least a component parallel to the longitudinal direction of the channel 208 hence parallel to the direction of fluid flow through the channel 208. Herein, a distance $d_1$ between the primary electronic circuit 214 and the heating element 204 not necessarily equals a distance $d_2$ between the secondary electronic circuit 220 and the heating element. Given the flow direction in this example as indicated by the arrows, the primary electronic circuit 214 is located downstream from the heating element 204 and the secondary electronic circuit 220 is at an upstream position with respect to the heating element 204.

In this specific embodiment, the primary and secondary electronic circuits 214 and 220, respectively, are in thermal communication with the fluid 210. For that purpose, the primary and secondary electronic circuits 214 and 220 are installed in the wall 206 in relatively close proximity of the fluid 210. As a result, assuming the flow direction of this example, the temperature of the primary circuit 214 resembles the fluid's temperature downstream from the heating element 204 whereas the temperature of the secondary circuit 220 is substantially equal to the fluid's temperature upstream from the heating element 204. Preferably, in this specific example the primary and secondary electronic circuits 214 and 220 are thermally isolated from the heating element 204.

At zero flow conditions heat transfer from the heating element 204 to the fluid 210 occurs through conduction, which leads to a symmetrical temperature distribution for the fluid 210 in longitudinal direction with respect to the heating element 204. For non-zero flow conditions heat transfer is mainly determined by forced convection. Forced convection causes the temperature distribution of the fluid 210 to be asymmetrical along the flow direction of the fluid 210. That is, downstream of the heating element the fluid 210 will have a higher temperature than upstream of the heating element since heat has been transferred to the fluid 210 flowing along the heating element 204. An increase in fluid flow velocity increases convection based heat transfer and thereby increases the asymmetry of the aforementioned temperature distribution. Because of the thermal communication between the fluid 210 and the primary and secondary electronic circuits 214 and 220, which circuits are situated downstream and upstream from the heating element 204 respectively, the temperature dependent primary and secondary capacitances will reflect the aforementioned temperature asymmetry, see, e.g., equation [4]. Likewise the primary and secondary resonance frequencies will change in accordance with the aforementioned asymmetric temperature distribution. Therefore, the numerical difference between the primary and secondary resonance frequencies is indicative for the velocity at which the fluid 210 is flowing though the channel 208.

The sensor system 202 comprises a transducer arrangement 226 for generating a measurement signal 228 indicative for the velocity of the fluid 210. In this specific example, the transducer arrangement 226 comprises a grid dip oscillator 230 known per se for wirelessly determining the primary and secondary resonance frequencies during operation of the sensor system 202. A signal 232 represents the primary resonance frequency whereas a further signal 234 represents the secondary resonance frequency as determined by the grid dip oscillator 230. In this particular example the measurement signal 228 is based on the numerical difference between the primary and secondary resonance frequencies according to equation [8], e.g., by way of the comparator 236. Thereby, the sign of the measurement signal 228 allows for determination of the fluid flow direction. The grid dip oscillator 230 wirelessly provides power to the heating element 204 via inductive coupling with a resistor 212 that is electrically connected to the heating element 204. In this particular example, the resistor 212 is mounted on top of the heating element 204.

Figure 3:
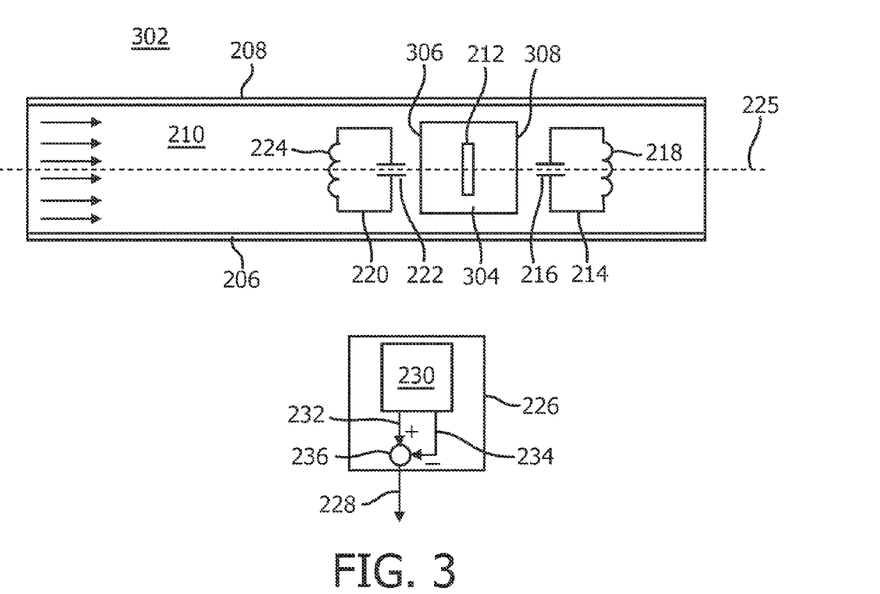
FIG. 3 schematically depicts an embodiment of the sensor system according to the invention similar to the embodiment depicted in FIG. 2, however, wherein the primary and secondary electronic circuits are in thermal communication with the heating element.

FIG. 3 schematically depicts a sensor system 302, comprising a heating element 304 which is installed in a wall 206 of a channel 208 through which a fluid 210 is flowing. The sensor system 302 furthermore comprises a primary electronic circuit 214. A power source electrically connected to the heating element 304 is configured for providing a predetermined level of power to said heating element 304. The power source may be arranged for receiving power in a wireless manner, e.g., via electromagnetic radiation. In this particular example, the primary electronic circuit 214 comprises a primary capacitor 216 having a temperature dependent primary capacitance and a primary inductor 218 having a primary inductance. Consequently, the primary electronic circuit 214 is characterized by a temperature dependent primary resonance frequency, see equation [2]. In this specific embodiment the sensor system 302 furthermore comprises a secondary electronic circuit 220. In this particular embodiment, the primary and secondary electronic circuits 214 and 220 are substantially identical. Hence the secondary electronic circuit 220 comprises a secondary capacitor 222 having a secondary capacitance that equals the primary capacitance if the primary and secondary capacitors 216 and 222 are subject to equal temperatures. The secondary electronic circuit 220 furthermore comprises a secondary inductor 224 having a secondary inductance equal to the primary inductance. As a result, the temperature dependent behavior of the resonance frequency associated with the secondary electronic circuit 220, i.e. the secondary resonance frequency, equals the temperature dependent behavior of the primary resonance frequency.

The primary electronic circuit 214 and the secondary electronic circuit 220 are situated at predetermined locations on opposite sides of the heating element 304 along an axis 225 having a at least a component parallel to the longitudinal direction of the channel 208 hence parallel to the direction of fluid flow through the channel 208. Given the flow direction in this example as indicated by the arrows, the primary electronic circuit 214 is located downstream from the heating element 304 and the secondary electronic circuit 220 is at an upstream position with respect to the heating element 304. In this specific embodiment, the primary and secondary electronic circuits 214 and 220 are in thermal communication with the heating element 304. For that purpose, the primary and secondary electronic circuits 214 and 220 are installed in close proximity of the heating element 304. That is, assuming the flow direction of this example, the primary electronic circuit 214 is situated near a downstream side 308 of the heating element 304 and the secondary electronic circuit 220 is installed near an upstream side 306 of the heating element 304. As a result the temperature of the primary circuit 214 resembles the downstream temperature of the heating element 304 whereas the temperature of the secondary circuit 220 is substantially equal to the upstream temperature of the heating element 304. Preferably, in order to increase measurement accuracy, the heating element 304 is provided with a relatively large size in a direction parallel to the longitudinal direction of the channel 208 as to enable the fluid 210 flowing past the heating element 304 to bring about a significant asymmetrical thermal gradient across the heating element 304. It is furthermore preferred that the primary and secondary electronic circuits 214 and 220 are thermally isolated from the heating element 304.

Analogous to the embodiment depicted in FIG. 2, at zero flow conditions heat transfer for the heating element 304 to the fluid 210 occurs through conduction, which leads to a symmetrical temperature profile across the heating element including but not limited to the longitudinal direction of the channel 208. For non-zero flow conditions heat transfer is mainly determined by forced convection. Forced convection causes the temperature distribution of the heating element 304 to be asymmetrical. That is, the downstream side 308 of the heating element 304 will have a higher temperature than the upstream side 306 of the heating element 304 since heat has been transferred to the fluid 210 flowing past the heating element 304. An increase in fluid flow velocity increases convection based heat transfer and thereby increases the asymmetry of the aforementioned temperature distribution. Because of the thermal communication between the heating element 304 and the primary and secondary electronic circuits 214 and 220, the temperature dependent primary and secondary capacitances will reflect said temperature asymmetry according to, e.g., equation [4]. Therefore, the numerical difference between the primary and secondary resonance frequencies is indicative for the velocity at which the fluid 210 is flowing though the channel 208.

The sensor system 302 comprises a transducer arrangement 226 for generating a measurement signal 228 indicative for the velocity of the fluid 210. In this specific example, the transducer arrangement 226 comprises a grid dip oscillator 230 known per se for wirelessly determining the primary and secondary resonance frequencies during operation of the sensor system 302. A signal 232 represents the primary resonance frequency whereas a further signal 234 represents the secondary resonance frequency as determined by the grid dip oscillator 230. In this particular example the measurement signal 228 is based on the numerical difference between the primary and secondary resonance frequencies according to equation [8], e.g., by way of the comparator 236. Thereby, the sign of the measurement signal 228 allows for determination of the fluid flow direction.

Figure 4:
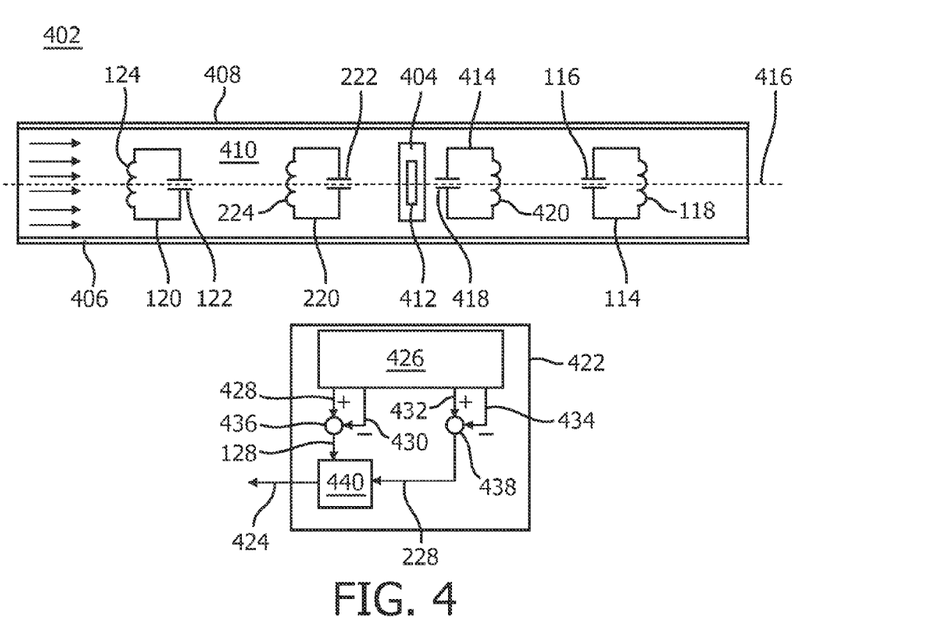
FIG. 4 schematically shows an embodiment of the sensor system according to the invention comprising primary, secondary, reference and further electronic circuits.

FIG. 4 schematically shows a sensor system 402, comprising a heating element 404 installed in a wall 406 of a channel 408 through which a fluid 410 is flowing during operation. The heating element 404 is configured for receiving power via electromagnetic radiation. In this example, the heating element is in thermal communication with an absorber 412 configured for absorbing electromagnetic radiation of a particular wavelength, e.g., visible light. The sensor system 404 furthermore comprises a primary electronic circuit 114 which is situated in the wall 406 as well. In this particular example, the primary electronic circuit 114 comprises a primary capacitor 116 having a temperature dependent primary capacitance and a primary inductor 118 having a primary inductance. Consequently, the primary electronic circuit 114 is characterized by a temperature dependent primary resonance frequency. At least the primary capacitor comprised in the electronic circuit 114, is in thermal communication with the heating element 404.

In this specific example, the sensor system 402 furthermore comprises a reference electronic circuit 120, a secondary electronic circuit 220 and a further electronic circuit 414. Herein, the reference electronic circuit is thermally isolated from the heating element 404 analogous to the embodiment as depicted in FIG. 1, e.g., by situating the reference electronic circuit 120 relatively remote form the heating element 404. In this specific embodiment, the secondary electronic circuit 220 and the further electronic circuit 414 are situated at predetermined locations on opposite sides of the heating element 404 along an axis 416 having at least a component that is parallel to the longitudinal axis of the channel 408. The secondary electronic circuit 220 and the further electronic circuit 414 are in thermal communication with the fluid 410. For that purpose, the secondary electronic circuit 220 and the further electronic circuit 414 are preferably installed in the wall 406 in relatively close proximity of the fluid 410. As a result, assuming the flow direction of this example, the temperature of the further electronic circuit 414 resembles the fluid's temperature downstream from the heating element 404 whereas the temperature of the secondary circuit 220 is substantially equal to the fluid's temperature upstream from the heating element 404. Preferably, in order to increase the sensor system's measurement accuracy, the secondary electronic circuit 220 and the further electronic circuit 414 are thermally isolated from the heating element 404.

The aforementioned electronic circuits are each substantially identical to the primary electronic circuit 114. Hence, the further electronic circuit 414 likewise comprises a further capacitor 418 having a further temperature dependent capacitance and a further inductor 420 having a further inductance. As a result, the resonance frequencies associated with the primary, reference secondary and further electronic circuits exhibit similar temperature dependent behavior.

The sensor system 402 comprises a transducer arrangement 422 for generating a measurement signal 424 indicative for the velocity of the fluid 410 flowing through the channel 408. In this example, the transducer arrangement 422 comprises a grid dip oscillator 426 known per se for wirelessly determining the resonance frequencies associated with the primary electronic circuit 114, the reference electronic circuit 120, the secondary electronic circuit 220 and the further electronic circuit 414. A first signal 428 represents the primary resonance frequency as determined by the grid dip oscillator 426 during operation; a second signal 430 likewise represents the reference resonance frequency, a third signal 432 analogously represents the secondary resonance frequency and a fourth signal 434 represents the further resonance frequency. In this particular example, the measurement signal 424 is based on the ratio between measurement signals 128 and 228, That is, the measurement signal 424 relates to the ratio of the numerical difference between the primary and reference resonance frequencies and the numerical difference between the secondary and further resonance frequencies according to equation [9]. For that purpose, a first comparator 436 is configured for generating the measurement signal 128 whereas a second comparator 438 is arranged for generating the measurement signal 228. A processor 440 comprised in the transducer arrangement 422 is configured for computing the measurement signal 424 based on the measurement signals 128 and 228.

Figure 5:
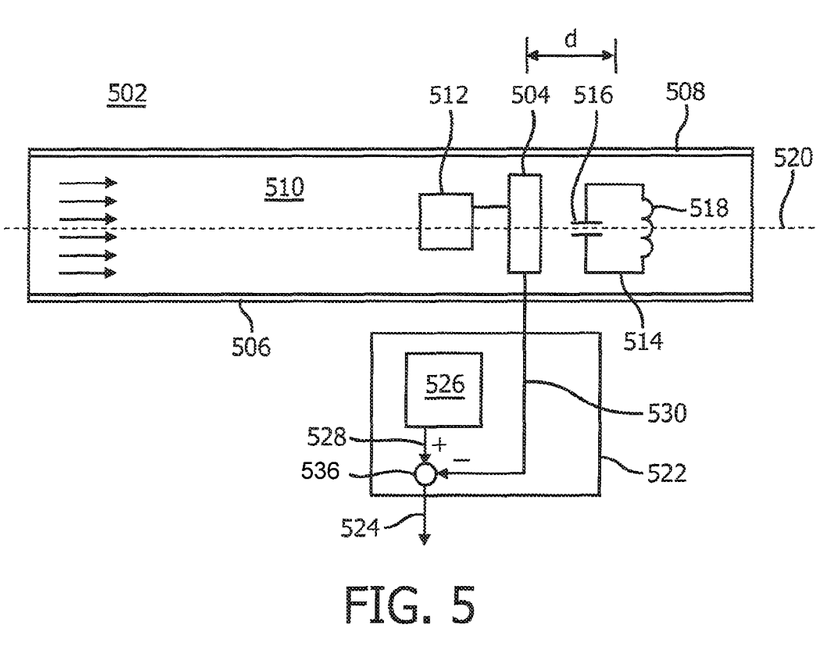
FIG. 5 schematically shows an embodiment of the sensor system according to the invention comprising a power source configured for providing a predetermined time-varying level of power to the heating element.

FIG. 5 schematically depicts a sensor system 502, comprising a heating element 504 for heating a fluid 510 that is flowing through a channel 508. For that purpose, the heating element 504 may be situated in a wall 506 of the channel 508. The sensor system 502 comprises a power source 512 configured for providing the heating element 504 with a predetermined time varying level of power. The sensor system 502 furthermore comprises a primary electronic circuit 514. In this particular example, the primary electronic circuit 514 comprises a primary capacitor 516 having a temperature dependent primary capacitance and a primary inductor 518 having a primary inductance. Consequently, the primary electronic circuit 514 is characterized by a temperature dependent primary resonance frequency, see equation [2]. Herein, at least the primary capacitor 516 comprised in the primary electronic circuit is in thermal communication with the fluid 510. For that purpose, the primary capacitor 516 is preferably situated in the wall 506 in close proximity of the fluid 510.

Herein, the primary electronic circuit 514 is situated a predetermined distance d from the heating element measured along an axis 520 having at least a component parallel to the longitudinal direction of the channel 508. As a result, the temperature of at least the primary capacitor 516 is substantially equal to the fluid's temperature at said predetermined distance d from the heating element 504.

Because the level of power supplied during operation to the heating element 504 is time-varying, the amount of heat transferred by the heating element 504 to the fluid 510 will be time-varying in response thereto. At zero flow conditions the time of flight, i.e. the times it takes to register a variation in the power supply to the heating element 504 at the location of the primary electronic circuit 514, fully depends on the thermal diffusivity of both the fluid 510 and the wall 506. For non-zero flow conditions, the time of flight is mainly determined by the velocity at which the fluid 510 flows through the channel 508. Obviously an inversely proportional relationship exists between the fluid flow velocity and the aforementioned time of flight. In this particular embodiment the time of flight is observed by measuring the duration after which the primary resonance frequency changes in response to a variation in the level of power supplied to the heating element 504.

The sensor system 502 comprises a transducer arrangement 522 for generating a measurement signal 524 indicative for the velocity of the fluid 510 flowing through the channel 508. In this specific embodiment, the transducer arrangement 522 comprises a grid dip oscillator 526 known per se for wirelessly determining the primary resonance frequency. The primary resonance frequency is sampled at an appropriate sample rate, e.g., a sample rate in the range of 1 Hz to 1 kHz. During operation, a comparator 536 compares a signal 528 representing the primary resonance frequency as a function of time with a signal 530 representing the level of power supplied to the heating element 504 as a function of time for the purpose of computing the measurement signal 524.

The power source 512 may be configured for providing the time varying level of power to the heating element 504 by way of a series of power pulses. Herein, the period between consecutive power pulses may be varying. Alternatively, the power source 512 is configured for providing the heating element 504 with a sinusoidally varying level of power.

While the invention has been illustrated and described in detail in the drawings and in the foregoing description, the illustrations and the description are to be considered illustrative or exemplary and not restrictive. The invention is not limited to the disclosed embodiments. It is noted that the sensor and the control unit according to the invention and all their components can be made by applying processes and materials known per se. In the set of claims and the description the word "comprising" does not exclude other elements and the indefinite article "a" or "an" does not exclude a plurality. Any reference signs in the claims should not be construed as limiting the scope. It is further noted that all possible combinations of features as defined in the set of claims are part of the invention.

In addition, the section headings included herein are intended to facilitate a review but are not intended to limit the scope of the present system. Accordingly, the specification and drawings are to be regarded in an illustrative manner and are not intended to limit the scope of the appended claims.

The invention claimed is:

1. A sensor system for measuring a velocity of a fluid flowing through a channel, comprising:
    a heating element for heating the fluid, wherein the heating element is provided with a known level of power during operation;
    a primary electronic circuit having a primary resonance frequency, wherein the primary resonance frequency is temperature dependent, wherein a temperature of at least a part of the primary electronic circuit is determined by heat transferred from the heating element to the fluid flowing through the channel, said at least a part being responsible for making the primary resonance frequency temperature dependent; and
    a transducer arrangement configured to generate a measurement signal indicative of the velocity of the fluid flowing through the channel, wherein the measurement signal is based on the primary resonance frequency,
    wherein the primary electronic circuit comprises a resonant circuit including an inductor connected in series with a capacitor of the heating element, and wherein the capacitor has a capacitance that is dependent on temperature.

2. The sensor system according to claim 1, wherein the transducer arrangement comprises a grid dip oscillator configured to determine the primary resonance frequency of the primary electronic circuit.

3. The sensor system according to claim 2, wherein the heating element comprises a resistor configured to receive power via an inductive coupling with the grid dip oscillator.

4. The sensor system according to claim 1, wherein the primary electronic circuit is in thermal communication with the heating element.

5. The sensor system according to claim 4, comprising a reference electronic circuit having a temperature dependent reference resonance frequency, and wherein the transducer arrangement is configured to generate the measurement signal based on a numerical difference between the primary resonance frequency and the reference resonance frequency.

6. The sensor system according to claim 5, wherein the primary electronic circuit and the reference electronic circuit are substantially identical.

* * * * *